Oct. 12, 1926.

S. JAMES 1,602,616

ELECTRICITY METER

Filed August 27, 1923  2 Sheets-Sheet 2

Inventor
S. James
By Marks & Clerk
Attys.

Patented Oct. 12, 1926.

1,602,616

UNITED STATES PATENT OFFICE.

SAMUEL JAMES, OF BIRMINGHAM, ENGLAND, ASSIGNOR TO CHAMBERLAIN & HOOKHAM LIMITED, OF BIRMINGHAM, ENGLAND.

ELECTRICITY METER.

Application filed August 27, 1923. Serial No. 659,622.

Electricity is frequently supplied to consumers on the following and similar conditions. A fixed sum per annum is charged, depending upon an agreed maximum demand, and so long as the consumer's demand does not exceed the pre-arranged amount, the quantity of electrical energy supplied is charged at a certain price per unit. If this agreed demand is exceeded, the excess energy supplied is charged at a higher price per unit.

The object of the present invention is to provide an improved meter for use where tariffs of the above mentioned kind are employed. The invention is also applicable to tariffs for alternating current in which a specified power factor is made the basis of contract. For example, it is sometimes arranged that so long as the power factor does not fall below an agreed figure, a certain charge is made per unit consumed, but when the power factor falls below that figure, the energy consumed at the lower power factor is charged at a higher rate.

Where reference is made in the following to power factor or maximum demand, it is to be understood that the terms are used in connection with average values over an interval determined by the meter, and not instantaneous values.

The invention comprises the use of a pair of principal elements (one of which may be a clock or its equivalent and the other a suitable electricity meter, or both may be electricity meters) and a mechanism under the control of both elements, one of the latter serving to impart movement to the mechanism in one direction, and the other to cause the resetting of the mechanism to its initial position at the end of predetermined intervals, the mechanism being utilized to bring into action when required a device for registering the energy or other quantity which is outside a predetermined limit.

In the accompanying drawings, Figure 1 illustrates diagrammatically one manner of carrying the invention into effect. In this diagram the mechanism actuated by the meter is shown as receiving a sliding or linear motion. This is done mainly for convenience of illustration. It will be evident that the mechanism may be of a revolving type, and in practice such a type would ordinarily be adopted.

Figure 1:
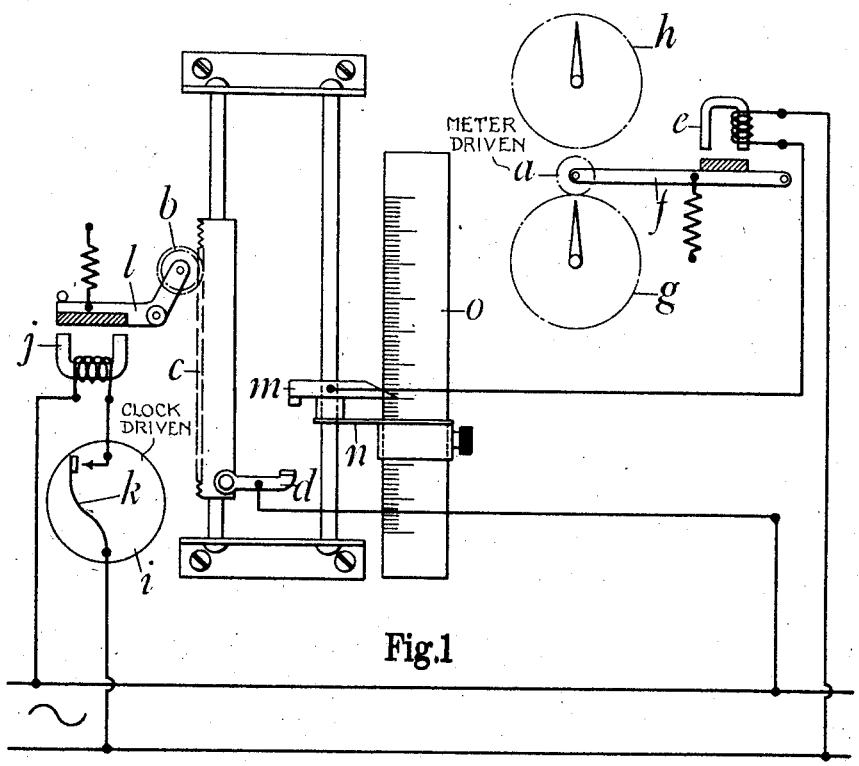

In applying the invention as shown in Figure 1 to a meter for use in a system such as that first described, namely, one in which there is an agreed maximum demand, one of the principal elements consists of an ordinary meter (not shown) arranged to transmit motion to a pinion $a$ which actuates an ordinary counter, and also to a pinion $b$ which operates a slidable rack $c$. The latter carries a contact arm $d$ forming part of a circuit through an electromagnet $e$ which controls an arm $f$ by which the pinion $a$ can be disengaged from a wheel $g$ in one counter, and engaged with another $h$ in a second counter. In conjunction with the mechanism is arranged the other principal element which is indicated by $i$, and may consist of a constant speed motor, or a clock, the function of which is at regular intervals to reset the movable contact $d$. This may be effected by momentarily closing the circuit of an electromagnet $j$ by a contact device $k$. The effect of the magnet on an arm $l$ carrying the pinion $b$ is to disengage the pinion from the rack $c$ and allow it to return to its initial position by gravity or a spring.

Adjacent to the contact $d$ is arranged a second contact $m$, the position of which in relation to the initial position of the contact $d$ can be adjusted by an abutment piece $n$ which is slidable on a suitably graduated scale $o$. The contact $m$ is such that it can be carried away from the abutment piece $n$ by the contact $d$, but when the latter returns the contact $m$ is arrested by the abutment piece.

Initially the abutment piece is fixed relatively to the scale at a position corresponding to the maximum rate of energy (or power) on which the consumer's contract is based. The scale is situated in an easily visible position within the meter case, so that it can be seen by the consumer, and if at any time a change is made in the contract, a simple movement of the abutment piece over the scale is all that is necessary to produce a corresponding change in the meter. When the meter is in action, the contact $d$ is advanced towards the contact $m$ and meanwhile the units consumed are registered on the first mentioned counter $g$. So long as the maximum demand is not exceeded the contact $d$ will never reach the contact $m$ during the intervals of movement determined by the other meter element $i$. In the event of an excessive demand, however, the contact $d$ will advance into engagement with the contact $m$ before the interval is completed, and will continue in engagement for the remainder of the interval. While the engagement is maintained the consumption is registered on the second counter $h$. At the end of the interval the contact $d$ will return to its initial position, and the connection with the first counter is restored. Thus, it will be seen, that so long as the maximum demand is not exceeded all energy consumed is registered on one counter $g$. Energy in excess of that demand is registered by the other $h$.

As already stated the mechanism associated with the contacts $d$, $m$, may be of the revolving type instead of as shown. It will be obvious that the pinion $b$ may be arranged to actuate a rotatable element carrying one of the contacts, and the other contact may be arranged to move in a circular path relatively to a circular scale or dial. Ordinarily in practice the latter is the arrangement preferred. An example is described later with reference to Figures 3 and 4.

When the invention is applied to tariffs in which power factor is made the basis of the contract between the consumer and the supply authority, the two metering elements may comprise, for example, a suitable energy meter, and a suitable wattless component, ampere hour, or other convenient meter, each provided with a counter. The energy meter also serves to reset a mechanism actuated by the wattless component meter in a similar manner to that above described. For example, in Figure 1, $i$ may represent an ordinary energy meter with its own counter, and an added contact device $k$. This contact is closed periodically after the passage of a predetermined quantity of energy. The pinions $a$ and $b$ may be actuated by a wattless component meter of which $h$ is the counter. In this case the counter $g$ would not be used, and normally the pinion $a$ would be out of engagement with the counter $h$. So long as the power factor does not fall below the predetermined value, no registration will take place on the counter operated by the wattless component meter, and owing to the periodic resetting of the mechanism by the action of the energy meter, the two contacts $d$, $m$ controlled by the wattless component meter never come together. But if during the interval controlled by the energy meter the wattless component meter causes the two contacts to engage, the electromagnet $e$ is caused to bring into action the counting train on the wattless component meter which then registers the excess wattless kilo-volt-ampere hours consumed up to the end of the interval.

Alternatively the energy meter may be provided with two counters, one of which will register energy during the period in which the contacts $d$, $m$, are separated, and the other the wattless component during the period in which the said contacts are together. The arrangement then resembles that of Figure 1 with the pinion $a$ driven by the energy meter and the pinion $b$ by the wattless component meter.

In connection with some tariffs it may be desirable to charge the consumer for what may be termed "complex units", that is to say, units which consist of varying proportions of two quantities. For example, in the case of tariffs based upon power factor the charge will be determined by the kilo-watt-hours consumed plus the kilo-volt-ampere hours of excess wattless component. By means of a differential gear driven from both the counting trains above referred to, a third counting train may be arranged to give the sum of the two registrations which will be in terms of "complex units". If the energy and the wattless kilo-volt-ampere hours are charged for at different rates, the third counting train, by the interposition of suitable gearing, may be caused to register such proportions of each of the components that the resultant registration may be charged at a fixed price. For example, if the energy is charged at approximately two cents per unit and the excess wattless component at approximately two-thirds of a cent per unit then by driving one member of the differential at the same rate as the energy counter and the other member at one-third the rate of the wattless component counter the total registration in complex units may be charged at the rate of approximately two cents per complex unit.

Figure 2:
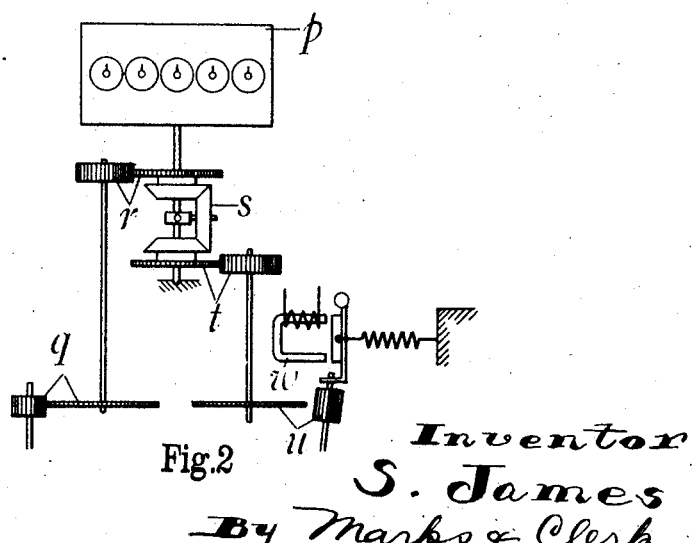
Figure 2 illustrates diagrammatically a device for use when it is desired to register "complex" units.

An example of a mechanism suitable for registering complex units is shown in Figure 2. Motion is taken to the counter $p$ from the energy meter through wheels $q$, $r$, and a differential mechanism $s$. In conjunction with the latter are other wheels $t$, $u$, which receive motion from the wattless component meter. So long as the average power factor does not fall below an agreed amount the wheels $u$ are separated. But when the average power factor falls the electromagnet $w$ (controlled by the contacts $d$, $m$, Figure 1) brings the wheels together and motion is communicated to the differential mechanism, the latter causing the sum of the two motions to be transmitted to the counter.

It will be apparent that the invention is capable of being carried out in a variety of ways, and is therefore not limited to the particular examples or details above described.

Figure 3:
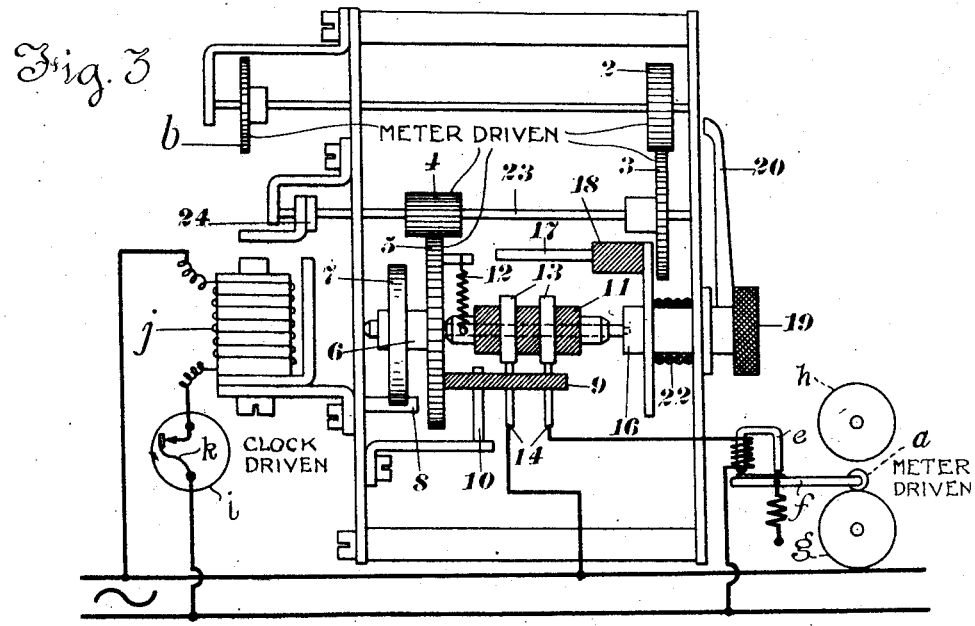
Figures 3 and 4 are side and part sectional front elevations showing diagrammatically an application of the invention to an instrument in which the mechanism receives a rotary motion.
Figure 4:
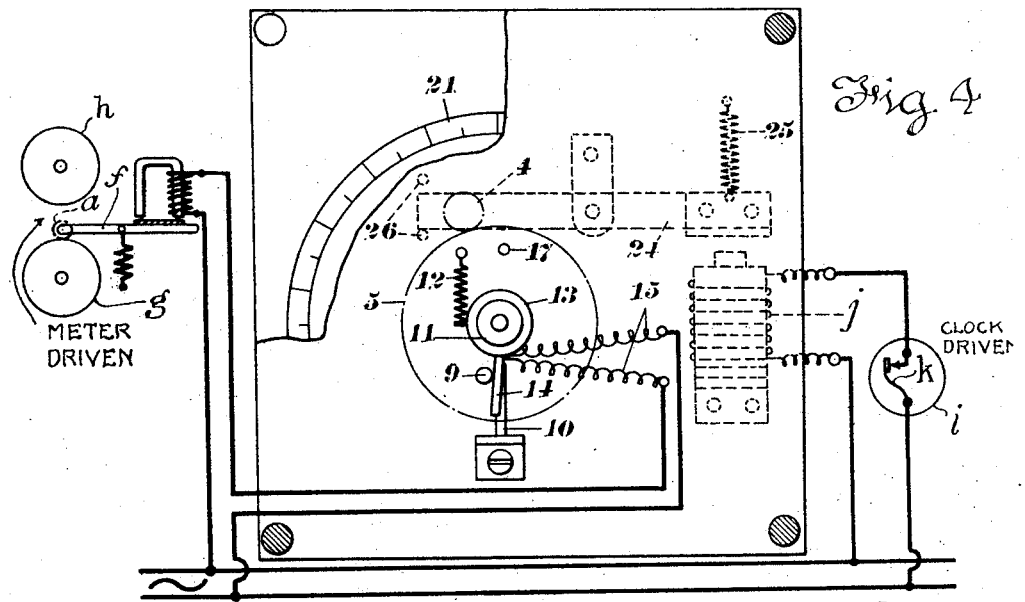

The instrument shown diagrammatically in Figures 3 and 4 is essentially the same as that shown in Figure 1, the principal difference being that it is adapted to operate with a circular instead of a rectilinear movement. The wheel $b$ is driven by the same meter as that which drives the pinion $a$ (in Figure 1). From $b$ motion is communicated through wheels 2, 3, 4, to a wheel 5. This latter is secured to an arbor or spindle 6 and is controlled by a flat coiled spring 7, which is secured at one end to the boss of the wheel, and at the other end to a fixed part 8 on the frame. From one side of the wheel 5 projects a bar 9 of insulating material. The initial position of the wheel 5 is determined by the abutment of the bar 9 against a fixed stop 10. On the spindle 6 is freely mounted a sleeve covered by a tube of insulating material 11. This sleeve is connected to the wheel 5 by a spiral spring 12, and on the sleeve are carried a pair of insulated metal rings 13 each provided with a radially projecting contact piece 14, and connected by a flexible silver or other wire 15 to a terminal in the circuit of an electromagnet similar to that indicated by $e$ in Figure 1. One end of the spindle 6 is supported by a rotatable bearing piece 16 which carries a metal bar 17 insulated by the part 18. The part 16 is rotatable by a finger piece 19 and is provided with an index 20 movable over a scale 21. The spiral spring 22 serves by its endwise pressure to set up sufficient frictional resistance to rotation to hold the part 16 in the position in which it is set.

The pinion 4 is secured to a spindle 23 one end of which is carried by a lever 24 controlled by an electromagnet $j$ and a spring 25. The lever is permitted sufficient freedom of movement between the stops 26 to allow the pinion 4 to be disengaged from the wheel 5 when the magnet $j$ is excited.

Assuming the index 20 to be set in a position corresponding to, for example, an agreed maximum demand, the meter which operates the pinion, as $a$, of the indicating mechanism as $g$ (Figure 3) also operates the wheels $b$, 2, 3, 4 and 5, and the latter through the spring 12 causes the contact pieces 14 to revolve towards the metal bar 17. If the maximum demand is not exceeded, the magnet $j$ is excited before the pieces 14 reach the bar 17, the pinion 4 is disengaged from the wheel 5, and the latter is returned to its initial position by the coiled spring 7; the contact pieces 14 also return during this movement under the action of the bar 9. Should, however, the maximum demand be exceeded during the interval between successive excitations of the coil $j$, the contact pieces 14 reach the bar 17 and close the circuit through the magnet $e$ (Figure 3) and cause the pinion $a$ to be moved into engagement with the indicating mechanism $h$. While the pieces 14 remain in contact with the bar 17 the wheel 5 is allowed to continue its motion, the spring 12 being meanwhile extended.

Having thus described my invention what I claim as new and desire to secure by Letters Patent is:—

1. In electricity meters, the combination comprising a measuring device, a registering device, means for imparting motion from the measuring device to the registering device, an electro-magnet for controlling said means, a pair of contacts in the electro-magnet circuit, the said contacts being normally separated but when brought together cause the electro-magnet circuit to be closed, means for adjusting the position of one of the contacts, means for imparting motion from the measuring device to the other contact, and means whereby the latter contact is periodically returned to its initial position, substantially as described.

2. In electricity meters, the combination comprising a measuring device, a pair of wheels both driven by said device, a registering device actuated by one of the wheels which can be moved into operative and inoperative relation with the registering device, an electro-magnet for effecting the connection and disconnection of the said wheel with the registering device, a rotatable contact actuated by the other wheel, a rotatably adjustable stationary contact with which the movable contact can co-operate, both contacts being in the electro-magnet circuit, an electro-magnet whereby the operative connection between the rotatable contact and its actuating means can be made and broken, and a spring for returning the movable contact to the initial position when released by the electro-magnet, substantially as described.

In testimony whereof I have signed my name to this specification.

SAMUEL JAMES.